Nov. 11, 1941.  D. A. BENNER  2,261,949
RAIL BENDER
Filed Nov. 4, 1939
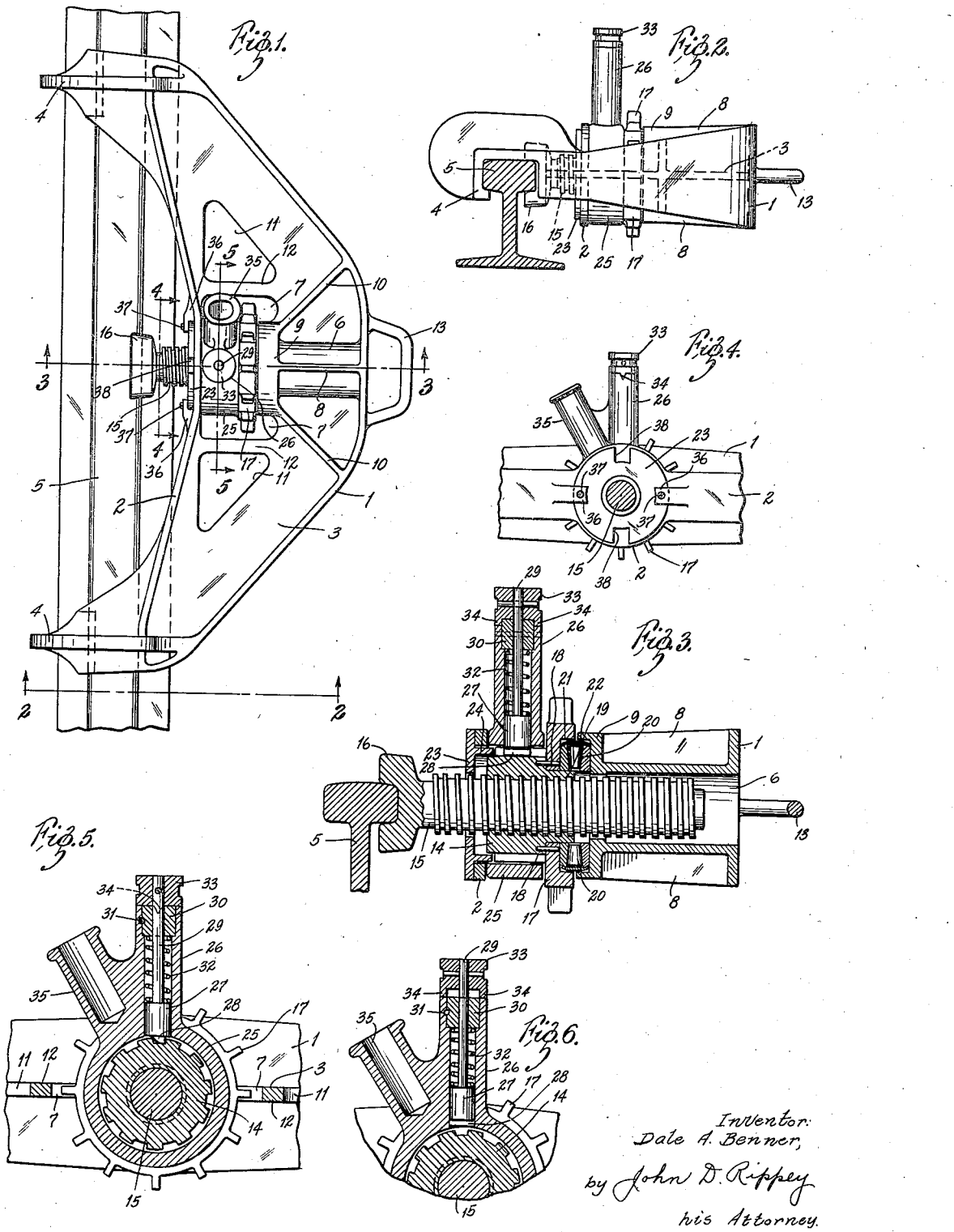
Inventor:
Dale A. Benner,
by John D. Rippey
his Attorney.

Patented Nov. 11, 1941

2,261,949

UNITED STATES PATENT OFFICE 2,261,949

RAIL BENDER

Dale A. Benner, Alton, Ill.

Application November 4, 1939, Serial No. 302,813

5 Claims. (Cl. 153—38)

This invention relates to rail benders adapted for use in bending or straightening railway rails and other metallic elements as may be required to adapt the same for their intended uses.

Objects of the invention are to provide an improved device or mechanism for use in bending or straightening railway rails and other metallic elements comprising a unitary frame of comparatively light weight and great strength whereby the device is easily portable and will sustain and withstand the great strains and stresses to which it is subjected when in use; to provide an operating nut mounted in said frame and held from displacement thereby for operating a threaded pressure shaft to bend or straighten the articles mounted in the frame; and to provide novel mechanisms for manual rotation of the nut in either direction to operate the shaft.

Another object of the invention is to provide a rail bender having a unitary frame and a pressure shaft mounted for longitudinal movements in the frame, in combination with a nut screwed on said shaft and rotatively supported in the frame for moving said shaft longitudinally, a thrust bearing for the nut facilitating rotation thereof, means for holding the nut and thereby the shaft from displacement relative to the frame, manual means for rotating the nut when said shaft is substantially free from longitudinal pressure, and other means for rotating the nut as required to operate the same to perform its intended functions.

Various other objects and advantages of the invention will be apparent from the following description, reference being made to the annexed drawing, in which—

Fig. 1 is a side elevation of my improved rail bender having a rail mounted in connection therewith.

Fig. 2 is an end elevation of the rail bender, the rail being shown in section as on the line 2—2 of Fig. 1.

Fig. 3 is a cross-sectional view of the bender frame and operating mechanism on the line 3—3 of Fig. 1.

Fig. 4 is a sectional view of the operating shaft on the line 4—4 of Fig. 1.

Fig. 5 is a sectional view of the operating mechanism on the line 5—5 of Fig. 1, showing the ratchet device engaging the nut to rotate the latter in a clockwise direction.

Fig. 6 is a similar sectional view showing the ratchet device detached from the nut and turned to position to rotate the nut in the opposite direction.

The metallic frame of my improved rail bender is a unitary structure formed with an angular or bowed outer tension member 1, an angular or bowed inner compression member 2 integrally connected with the member 1 by a web 3, hooks 4 integral with and projecting in parallel relationship from the ends of the frame to engage the element 5 to be bent or straightened, and a tubular socket 6 integral with the tension member 1 and the web 3 and having its axis normal to the element 5 engaged with the hooks 4. An enlarged central opening 7 is formed in the web 3 between the compression member 2 and the inner end of the socket 6 to receive the operating mechanism. Radial flanges 8 extend from the member 1 to a circumferential flange 9 at the inner end of the socket 6, and outwardly diverging flanges 10 are integral with opposite sides of the web 3 from the member 1 to the flange 9. Holes 11 may be formed through the web 3 to attain maximum lightness of weight and separated from the opening 7 by compression connections 12. A handle 13 is formed integral with the member 1 at opposite sides of the socket 6. To this extent the frame of my improved rail bender is the same as that disclosed in my companion application Serial No. 302,814 filed concurrently herewith.

A ratchet nut 14 is screwed on a shaft 15 that extends into the socket 6 and through an appropriate opening in the member 2, and has a head 16 in rigid connection with its inner end adapted to engage against the element 5 mounted on the hooks 4. A hand wheel 17 is attached to one end of the nut 14 by fasteners 18, a reduced portion 19 of the nut extending through said hand wheel. An anti-friction thrust bearing 20 is mounted within an annular race 21 in the hand wheel 17 and in a socket formed by an annular wall 22 projecting from the flange 9 toward the hand wheel. The thrust bearing holds the operating mechanism out of frictional engagement with the socket 6. This operating mechanism is mounted within the opening 7.

A ring 23 seats against the inner side of the frame member 2, and has an annular flange 24 projecting through said member 2 and enclosing the adjacent end of the ratchet nut 14, and cooperates with the thrust bearing 20 to prevent lateral displacement or objectionable oscillation of the operating mechanism and of the shaft 15. The flanges 9 and 24 hold the nut 14 in the frame and in axial alinement with the socket 6 irrespective of whether the shaft 15 is extended through said nut and into said socket 6 or not.

An annular frame 25 surrounds the ratchet nut 14, and is provided with a tubular radial extension 26. A ratchet head 27 is mounted for longitudinal and turning movements within the extension 26 and is formed on its inner end with a tooth 28 having one wall abrupt and the other wall inclined. As shown in Fig. 5, the abrupt wall engages one of the teeth of the ratchet nut 14 so that, when the frame 25 is turned in a clockwise direction, said ratchet nut will be turned thereby. However, if the nut be held from rotation in the opposite direction, the frame 25 may be turned in said opposite direction, the inclined wall of the tooth 28 permitting the ratchet device to escape over the teeth of the ratchet nut. Such rocking or alternately opposite turning movements are imparted to the frame 25 when the device is in use to bend or to straighten a rail or other element. The head 27 of the ratchet device has a stem 29 extending for longitudinal and turning movements through a plug 30 secured within the outer end of the extension 26 by a removable and replaceable fastener 31. A spring 32 mounted in the extension 26 between the head 27 and the plug 30 presses the ratchet head toward and into engagement with the ratchet nut 14 and permits escaping action of the ratchet device over and along the periphery of the ratchet nut 14, as already explained. A handle 33 is attached to the outer end of the stem 29 and is formed with teeth 34 for engagement in complementary notches in the outer end of the extension 26 to hold the ratchet head 27 turned to the position shown in Fig. 5, or to the position shown in Fig. 6. Thus, the ratchet head 27 may be latched in position for operation to rotate the ratchet nut 14 in either direction.

The frame 25 is formed with an integral socket 35 adapted to receive an end of an operating lever or bar for turning the operating mechanism in either direction to move the shafts 15 in one direction or the other as desired.

The frame part 2 is formed with a pair of integral lugs 36 extending under the ring 23 (Fig. 4) and provided with set screws 37 for clampingly engaging said ring 23 to prevent accidental turning or displacement thereof. The margins of the ring 23 are formed with notches 38 through which the lugs 36 may pass to permit placement or removal of the ring 23.

It should be apparent that the invention attains all of its intended objects and advantages efficiently and satisfactorily, and constitutes an easily portable mechanism that may be used for bending various articles other than rails. The device may be easily assembled and dismantled, as should be apparent from the description and drawing. I am aware that the invention may be varied in equivalent particulars without departure from the nature and principle thereof.

I claim:

1. In a portable rail bender, a metallic frame comprising spaced bowed inner and outer compression members integrally connected at their outer ends and having hooks integral with said ends, a web between and integrally connecting said members and having an enlarged central opening adjacent to said inner member, and an elongated tubular socket integral with said web and having an open inner end at said opening; a threaded shaft extending through said inner compression member and having its outer end enclosed within said socket; a nut screwed on said shaft within said opening in said web; a thrust bearing between said nut and the inner end of said socket for sustaining the thrust when said shaft is forced by operation of said nut against an article engaged by said hooks; a circumferential flange integral with the inner end of said socket engaged by and overlying said bearing; and detachable means in connection with said inner compression member co-operating with said bearing and said socket to prevent displacement of said nut.

2. In a portable rail bender, a metallic frame comprising spaced bowed inner and outer compression members integrally connected at their outer ends and having hooks integral with said ends, a web between and integrally connecting said members and having an enlarged central opening adjacent to said inner member and an elongated tubular socket integral with said web; and having an open inner end at said opening; a threaded shaft extending through said inner compression member and having its outer portion completely enclosed within said socket; a nut screwed on said shaft within said opening in said web; a thrust bearing between said nut and the inner end of said socket for sustaining the thrust when said shaft is forced by operation of said nut against an article engaged by said hooks; a detachable element in connection with said inner compression member cooperating with said bearing and said socket to prevent displacement of said nut; and mechanism for rotating said nut to force said shaft longitudinally against the article engaged with said hooks.

3. In a portable rail bender, a metallic frame comprising spaced bowed inner and outer compression members integrally connected at their outer ends and having hooks integral with said ends, a web between and integrally connecting said members and having an enlarged central opening adjacent to said inner member, and an elongated tubular socket integral with said web; a threaded shaft extending through said inner compression member and having its outer portion completely enclosed within said socket; a nut screwed on said shaft within said opening in said web; a thrust bearing between said nut and the inner end of said socket for sustaining the thrust when said shaft is forced by operation of said nut against an article engaged by said hooks; a detachable element in connection with said inner compression member cooperating with said bearing and said socket to prevent displacement of said nut; mechanism for rotating said nut to force said shaft longitudinally against the article engaged with said hooks; and a hand wheel attached to said nut and extending laterally beyond the same and beyond said socket for rotating said nut independently of said mechanism.

4. In a portable rail bender, a metallic frame comprising spaced bowed inner and outer compression members integrally connected at their outer ends and having hooks integral with said ends, a web between and integrally connecting said members and having an enlarged central opening adjacent to said inner member, and an elongated tubular socket integral with said web and having an open inner end at said opening; a threaded shaft extending through said inner compression member and having its outer end enclosed within said socket; a nut screwed on said shaft within said opening in said web; a thrust bearing between said nut and the inner end of said socket for sustaining the thrust when said shaft is forced by operation of said nut against an article engaged by said hooks; detachable means in connection with said inner compression member cooperating with said bearing and said socket to prevent displacement of said nut; and flanges integral with said web and said socket and converging from said outer compression member toward the inner end of said socket substantially preventing distortion of said socket when the device is operated.

5. In a portable rail bender, a metallic frame generally of arcuate shape and having a hook at each end for engaging a rail to be bent; an elongated tubular socket integral with the outer portion of said frame and having an open inner end; a threaded shaft extending beyond the inner side of said frame between said hooks; a circumferential bearing flange integral with the inner end of said socket; a nut screwed on said shaft; a thrust bearing between said nut and said flange; a removable and replaceable device attached to the inner side of said frame for supporting said nut in a position in which said bearing is against said flange; a ring enclosing said nut; means for rotating said ring; and a ratchet device supported by said ring for engaging and rotating said nut to force said shaft longitudinally against the rail engaged with said hooks.

DALE A. BENNER.